United States Patent
Lee et al.

(10) Patent No.: US 10,209,553 B2
(45) Date of Patent: Feb. 19, 2019

(54) DISPLAY DEVICE COMPRISING ANGULAR FILTER

(71) Applicant: Samsung Display Co., Ltd., Yongin-si, Gyeonggi-do (KR)

(72) Inventors: Kwangkeun Lee, Osan-si (KR); Youngmin Kim, Asan-si (KR); Haeil Park, Seoul (KR); Seungjin Baek, Suwon-si (KR); Junhan Lee, Seoul (KR); Kunhee Jo, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/700,804

(22) Filed: Sep. 11, 2017

(65) Prior Publication Data

US 2018/0074365 A1    Mar. 15, 2018

(30) Foreign Application Priority Data

Sep. 12, 2016  (KR) ........................ 10-2016-0117300

(51) Int. Cl.
*G02F 1/1335*    (2006.01)

(52) U.S. Cl.
CPC .. *G02F 1/133509* (2013.01); *G02F 1/133621* (2013.01); *G02F 1/133528* (2013.01); *G02F 2001/133507* (2013.01); *G02F 2001/133565* (2013.01); *G02F 2001/133614* (2013.01); *G02F 2201/123* (2013.01)

(58) Field of Classification Search
CPC ......... G02F 1/133509; G02F 1/133621; G02F 1/133528
USPC ....................................................... 349/106
See application file for complete search history.

(56) References Cited

U.S. PATENT DOCUMENTS

| | | | | |
|---|---|---|---|---|
| 5,985,173 | A * | 11/1999 | Gray | .................. C09K 11/0805 252/301.4 F |
| 6,781,650 | B1 * | 8/2004 | Colgan | ............. G02F 1/136209 349/110 |
| 7,750,984 | B2 | 7/2010 | Ha et al. | |
| 8,277,064 | B2 | 10/2012 | Willemsen et al. | |
| 2012/0099304 | A1 * | 4/2012 | Kim | ........................ G06F 3/042 362/231 |
| 2016/0133209 | A1 * | 5/2016 | Lee | .......................... G09G 3/36 345/698 |

FOREIGN PATENT DOCUMENTS

| | | |
|---|---|---|
| KR | 2012-0097774 | 9/2012 |
| KR | 2014-0060205 | 5/2014 |
| KR | 2016-0056493 | 5/2016 |

OTHER PUBLICATIONS

Google Patents Translation of KR 20070111858 A.*

* cited by examiner

*Primary Examiner* — Lucy P Chien
(74) *Attorney, Agent, or Firm* — Innovation Counsel LLP

(57) ABSTRACT

A display device includes: a backlight unit emitting a light; a first substrate on a path of a light emitted from the backlight unit; a pixel electrode on the first substrate; a light amount control layer on the pixel electrode; a first polarizer on the light amount control layer; a color conversion layer on the first polarizer; and an angular filter between the backlight unit and the color conversion layer. The color conversion layer includes a phosphor, and the angular filter blocks 50% or more of a light incident to the angular filter at an incident angle of 30 degrees or more.

20 Claims, 6 Drawing Sheets

DISPLAY DEVICE COMPRISING ANGULAR FILTER

CROSS-REFERENCE TO RELATED APPLICATION

This application claims priority under 35 U.S.C. § 119 to Korean Patent Applications No. 10-2016-0117300, filed on Sep. 12, 2016, in the Korean Intellectual Property Office (KIPO), the disclosure of which is incorporated by reference herein in its entirety.

1. TECHNICAL FIELD

Exemplary embodiments of the present inventive concept relate to a display device including an angular filter, and more particularly, to a display device including an angular filter capable of controlling transmittance of blue light based on an incident angle.

2. DISCUSSION OF RELATED ART

Liquid crystal display ("LCD") devices are a type of a flat panel display ("FPD") device, which has found wide recent applications. The LCD device includes two substrates including electrodes formed thereon and a liquid crystal layer interposed therebetween.

Upon applying voltage to the two electrodes, liquid crystal molecules of the liquid crystal layer are rearranged such that an amount of transmitted light is controlled in the LCD device. Such an LCD device includes a color filter to represent colors.

In recent times, a display device in which a color filter used in a conventional LCD device is replaced with a fluorescent pattern has been studied. Such a display device including a fluorescent pattern is referred to as a photoluminescent display ("PLD") device. The PLD device uses various films and filters in order to improve light efficiency.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments of the present inventive concept may be directed to a display device including an angular filter capable of controlling transmittance of light based on an incident angle.

According to an exemplary embodiment, a display device includes: a backlight unit emitting a light; a first substrate on a path of a light emitted from the backlight unit; a pixel electrode on the first substrate; a light amount control layer on the pixel electrode; a first polarizer on the light amount control layer; a color conversion layer on the first polarizer; and an angular filter between the backlight unit and the color conversion layer. The color conversion layer includes a phosphor, and the angular filter blocks about 50% or more of a light incident to the angular filter at an incident angle of about 30 degrees or more.

The angular filter may block about 50% or more of a blue light incident to the angular filter at an incident angle of about 30 degrees or more.

The angular filter may be between the first polarizer and the color conversion layer.

The angular filter may be between the light amount control layer and the first polarizer.

The angular filter may be between the first polarizer and the pixel electrode.

The angular filter may be between the backlight unit and the first substrate.

The display device may further include a second polarizer between the backlight unit and the light amount control layer.

The angular filter may be on the second polarizer.

The angular filter may include: a first layer having light transmittance and having a first refractive index; and a second layer having light transmittance and having a second refractive index different from the first refractive index.

The color conversion layer may include: a red color conversion portion absorbing a blue light and emitting a red light; and a green color conversion portion absorbing a blue light and emitting a green light.

The color conversion layer may further include a transmissive portion transmitting a blue light.

The light amount control layer may be a liquid crystal layer.

The phosphor may include: a core; and a shell surrounding the core.

The core may include at least one selected from the group consisting of: PbSe, InAs, PbS, CdSe, InGaP, CdTe, CdS, ZnSe, ZnTe, ZnS, HgTe and HgS.

The shell may include at least one selected from the group consisting of: CuZnS, CdSe, CdTe, CdS, ZnSe, ZnTe, ZnS, GaP, HgTe, and HgS.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the present inventive concept will become more apparent by describing in detail exemplary embodiments thereof with reference to the accompanying drawings, wherein.

DETAILED DESCRIPTION

Figure 1:
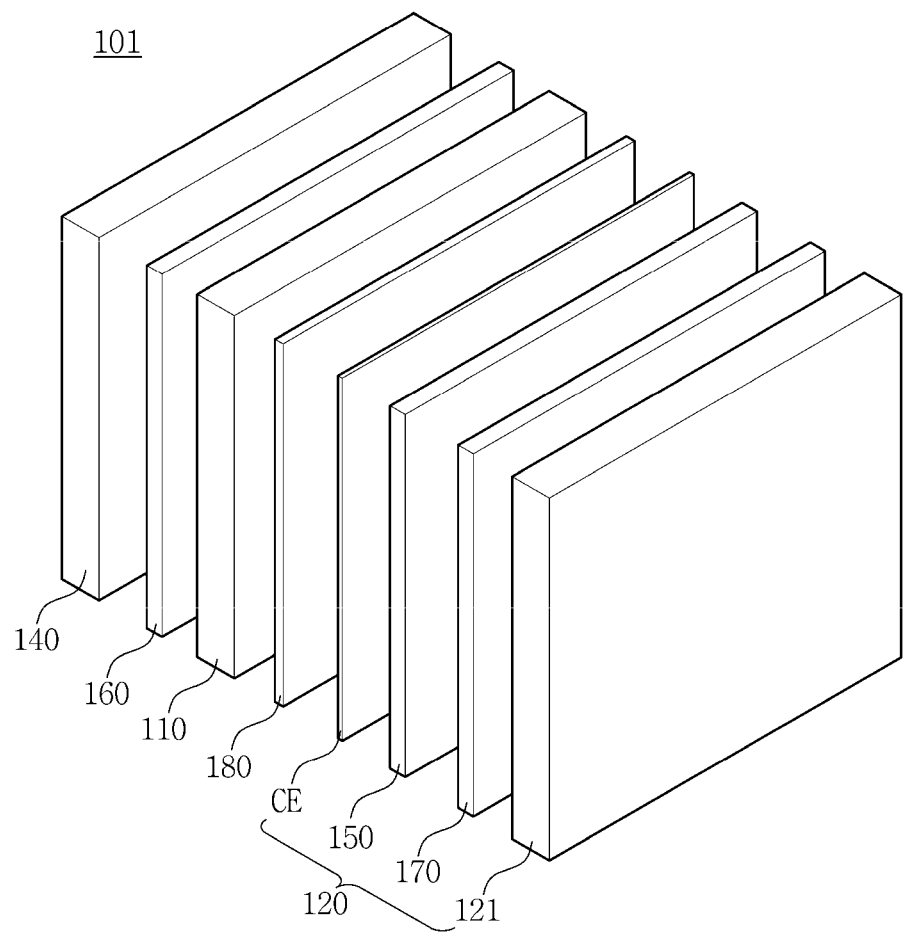
FIG. 1 is an exploded perspective view illustrating a display device according to a first exemplary embodiment.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, certain elements or shapes may be illustrated in an enlarged manner or in a simplified manner to better illustrate the invention, and other elements present in an actual product may also be omitted. Thus, the drawings are intended to facilitate the understanding of the present inventive concept.

When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have a same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a first exemplary embodiment will be described with reference to FIGS. 1, 2, and 3.

FIG. 1 is an exploded perspective view illustrating a display device according to a first exemplary embodiment.

Referring to FIG. 1, a display device according to the first exemplary embodiment includes a backlight unit 140, a second polarizer 160, a display substrate 110, a light amount control layer 180, and an opposing substrate 120 that are sequentially disposed. The opposing substrate 120 includes a common electrode CE, a first polarizer 150, a color conversion layer 170, and a second substrate 121.

The backlight unit 140 may emit ultraviolet ("UV") rays, rear ultraviolet rays, or the like. The backlight unit 140 may emit, for example, white light or blue light to the display substrate 110. Hereinafter, a first exemplary embodiment will be described based on a display device including the backlight unit 140 that emits blue light.

Although not illustrated, the backlight unit 140 may include a light source and a light guide plate. Alternatively, the backlight unit 140 may include a plurality of light sources below the display substrate 110.

The display substrate 110, the light amount control layer 180, and the opposing substrate 120 are disposed on a path of light emitted from the backlight unit 140.

Figure 2:
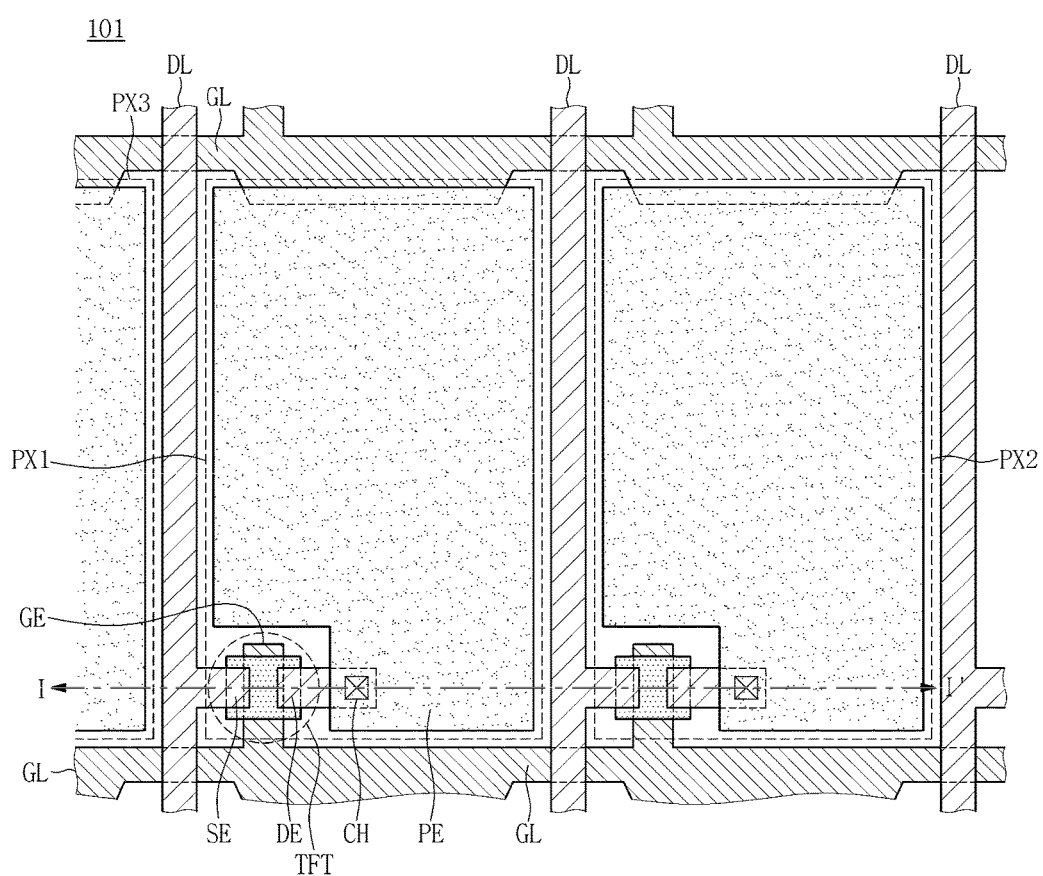
FIG. 2 is a plan view illustrating a pixel of the display device illustrated in FIG. 1.
Figure 3:
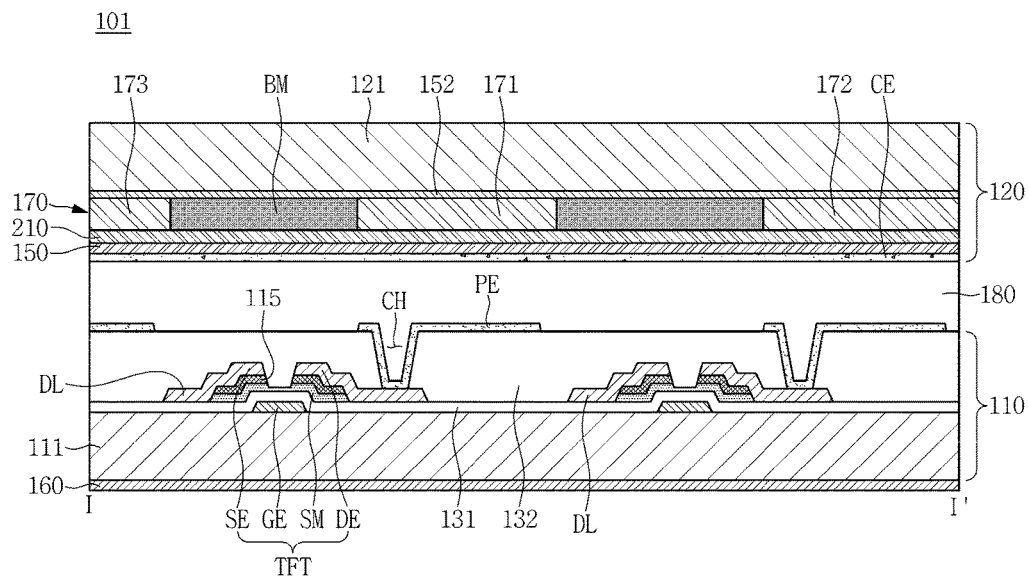
FIG. 3 is a cross-sectional view taken along line I-I' of FIG. 2.

FIG. 2 is a plan view illustrating a pixel of the display device illustrated in FIG. 1, and FIG. 3 is a cross-sectional view taken along line I-I' of FIG. 2.

Referring to FIGS. 2 and 3, the light amount control layer 180 is disposed between the display substrate 110 and the opposing substrate 120.

The light amount control layer 180 may use any layer that may control transmittance of light provided from the backlight unit 140. For example, the light amount control layer 180 may be one of a liquid crystal layer, an electro-wetting layer, and an electrophoresis layer. Hereinafter, the light amount control layer 180 will be described on the premise that it is a liquid crystal layer by way of example. In such an exemplary embodiment, the display device 101 according to the first exemplary embodiment may be referred to as a liquid crystal display ("LCD") device.

The display substrate 110 includes a first substrate 111, a thin film transistor ("TFT"), a pixel electrode PE, a gate insulating layer 131, and a protection layer 132. The TFT includes a semiconductor layer SM, an ohmic contact layer 115, a gate electrode GE, a source electrode SE and a drain electrode DE.

The first substrate 111 includes transparent glass or plastic and is disposed on the path of light emitted from the backlight unit 140.

A plurality of gate lines GL and the gate electrode GE are disposed on the first substrate 111. The gate line GL and the gate electrode GE are unitary. The gate line GL and the gate electrode GE may include or be formed of one of: aluminum (Al) or alloys thereof, silver (Ag) or alloys thereof, copper (Cu) or alloys thereof, molybdenum (Mo) or alloys thereof, chromium (Cr), tantalum (Ta), and/or titanium (Ti). At least one of the gate line GL and the gate electrode GE may have a multilayer structure including at least two conductive layers that have different physical properties.

The gate insulating layer 131 is disposed over an entire surface of the first substrate 111 including the gate line GL and the gate electrode GE. The gate insulating layer 131 may include silicon nitride ($SiN_x$) or silicon oxide ($SiO_x$). In addition, the gate insulating layer 131 may have a multilayer structure including at least two insulating layers having different physical properties.

The semiconductor layer SM is disposed on the gate insulating layer 131. In such an exemplary embodiment, the semiconductor layer SM overlaps the gate electrode GE below the gate insulating layer 131. The semiconductor layer SM may include or be formed of amorphous silicon, polycrystalline silicon, or the like. The semiconductor layer SM may include an oxide semiconductor material.

The ohmic contact layer 115 is disposed on the semiconductor layer SM. For example, the ohmic contact layer 115 is disposed on the semiconductor layer SM except for in a channel area of the semiconductor layer SM.

Further, a plurality of data lines DL are disposed on the gate insulating layer 131. The data line DL intersects the gate line GL. The source electrode SE and the data line DL are unitary. The source electrode SE is disposed on the ohmic contact layer 115. A drain electrode DE is disposed on the ohmic contact layer 115 and is connected to the pixel electrode PE.

At least one of the data line DL, the source electrode SE, and the drain electrode DE may include or be formed of a refractory metal, such as molybdenum, chromium, tantalum, and titanium, or an alloy thereof. At least one of the data line DL, the source electrode SE, and the drain electrode DE may have a multilayer structure including a refractory metal layer and a low-resistance conductive layer.

The protection layer 132 is disposed over an entire surface of the first substrate 111 including the gate insulating layer 131, the semiconductor layer SM, the data line DL, the source electrode SE and the drain electrode DE. The protection layer 132 may include an inorganic insulating material such as silicon nitride ($SiN_x$) or silicon oxide ($SiO_x$). Alternatively, the protection layer 132 may include an organic layer. The protection layer 132 may have a bilayer structure including a lower inorganic layer and an upper organic layer.

The pixel electrode PE is disposed on the protection layer 132. In such an exemplary embodiment, the pixel electrode PE is connected to the drain electrode DE through a contact hole CH of the protection layer 132. The pixel electrode PE may include a transparent conductive material such as IZO or ITO.

The second polarizer 160 is disposed on the display substrate 110. For example, the second polarizer 160 may be disposed between the backlight unit 140 and the light amount control layer 180. Referring to FIG. 3, the second polarizer 160 is disposed on a rear surface of the first substrate 111. Herein, a surface of the first substrate 111 on the side of the backlight unit 140 is referred to as the rear side of the first substrate 111.

The opposing substrate 120 includes the second substrate 121, the color conversion layer 170, the first polarizer 150, and the common electrode CE. According to the first exemplary embodiment, the opposing substrate 120 further includes a light blocking layer BM.

The second substrate 121 may include transparent glass or plastic. A passivation layer 152 is disposed on the second substrate 121. The passivation layer 152 may be omitted.

The light blocking layer BM is disposed on the passivation layer 152. The light blocking layer BM has a plurality of openings. The openings are defined corresponding to respective pixel electrodes PE of first, second and third pixels PX1, PX2 and PX3. The light blocking layer BM blocks light at portions aside from the openings. For example, the light blocking layer BM is disposed on the TFT, the gate line GL, and the data line DL to block light that has passed through them from being emitted outwards. The light blocking layer BM is not invariably necessarily and may be omitted.

The color conversion layer 170 is disposed on the second substrate 121 and converts a wavelength of light incident from the backlight unit 140 to emit light having a different wavelength. According to the first exemplary embodiment, the color conversion layer 170 includes a phosphor (i.e., a fluorescent material).

For example, the color conversion layer 170 includes a first color conversion portion 171 and a second color conversion portion 172. The first and second color conversion portions 171 and 172 include a phosphor that absorbs light having a predetermined wavelength and emits light having a different wavelength. The first and second color conversion portions 171 and 172 may be separated from each other by the light blocking layer BM.

Each of the color conversion portions 171 and 172 is disposed so as to overlap the pixels PX1 and PX2. For example, each of the color conversion portions 171 and 172 may be disposed at the opening of the light blocking layer BM corresponding to the pixel electrode PE.

Referring to FIG. 3, the first color conversion portion 171 may correspond to a red pixel PX1, and the second color conversion portion 172 may correspond to a green pixel PX2. In such an exemplary embodiment, the first color conversion portion 171 emits a red light and the second color conversion portion 172 emits a green light. That is, the first color conversion portion 171 is a red color conversion portion and the second color conversion portion 172 is a green color conversion portion.

The first color conversion portion 171 includes a red phosphor and the second color conversion portion 172 includes a green phosphor. According to the first exemplary embodiment, the red phosphor absorbs a blue light to emit a red light, and the green phosphor absorbs a blue light to emit a green light.

The color conversion layer 170 of FIG. 3 includes a transmissive portion 173. The wavelength of light passing through the transmissive portion 173 does not change. When the backlight unit 140 emits blue light, the transmissive portion 173 corresponds to the blue pixel PX3.

Although not illustrated, the color conversion layer 170 may further include a third color conversion portion that absorbs a blue light to emit a light of a different color other than red and green.

The color conversion portions 171 and 172 included in the color conversion layer 170 may each include a resin including a phosphor. The phosphor is a substance that emits fluorescence upon irradiated with light, radiant light, or the like, and emits light having a color inherent to the corresponding phosphor. In addition, the phosphor emits light in all directions irrespective of a propagation direction of the irradiated light.

A quantum dot, a quantum rod, or the like may be used as the phosphor.

According to the first exemplary embodiment, a quantum dot is used as the phosphor. The quantum dot absorbs light incident thereto and emits light having a different wavelength from a wavelength of the incident light. That is, the quantum dot is a wavelength converting particle that may convert a wavelength of light incident to the quantum dot. A wavelength range a quantum dot may convert may vary depending on the size of the quantum dot. For example, by adjusting a diameter of the quantum dot, the quantum dot may emit light of a desired color.

The quantum dot has a high extinction coefficient and a high quantum yield, as compared to those of other fluorescent dyes, thus emitting significantly intense fluorescence. In particular, the quantum dot may absorb light of shorter wavelengths and then emit light of longer wavelengths.

The quantum dot may have a structure including a core and a shell surrounding the core. The shell may have two or more layers. In addition, the quantum dot may further include an organic ligand bound to the shell and may include an organic coating layer surrounding the shell.

The quantum dot may include at least one substance of group II compound semiconductors, group III compound semiconductors, group V compound semiconductors, and group VI compound semiconductors. For example, the core forming the quantum dot may include at least one of: PbSe, InAs, PbS, CdSe, InGaP, CdTe, CdS, ZnSe, ZnTe, ZnS, GaP, HgTe, and/or HgS. Further, the shell may include at least one of: CuZnS, CdSe, CdTe, CdS, ZnSe, ZnTe, ZnS, GaP, HgTe, and/or HgS.

The quantum dot may be formed by a wet-chemical method. The wet-chemical method is a method of growing particles by adding a precursor material to an organic solvent.

Further, the color conversion layer 170 may further include a reflector. The reflector may include TiO2, for example. The reflector may have a particle shape, and may be dispersed in a resin including the phosphor.

The first polarizer 150 is disposed on the color conversion layer 170, with respect to the second substrate 121. Referring to FIG. 3, the first polarizer 150 is disposed below the color conversion layer 170. That is, the first polarizer 150 is disposed more adjacent to, i.e., closer to, the light amount control layer 180 than the color conversion layer 170 is thereto.

A transmission axis of the first polarizer 150 and a transmission axis of the second polarizer 160 are orthogonal to each other, and one of the transmission axes thereof is parallel to the gate line GL.

The common electrode CE is disposed on the first polarizer 150. For example, the common electrode CE may be disposed over an entire surface of the second substrate 121 including the first polarizer 150. The common electrode CE may include a transparent conductive material such as ITO or IZO.

Referring to FIG. 3, the light amount control layer 180 is disposed on the display substrate 110, the common electrode CE is disposed on the light amount control layer 180, the first polarizer 180 is disposed on the common electrode CE, the color conversion layer 170 is disposed on the first polarizer 150, and the second substrate 121 is disposed on the color conversion layer 170.

The common electrode CE, along with the pixel electrode PE, applies an electric field to the light amount control layer 180. Accordingly, an electric field is generated over the liquid crystal layer, which is the light amount control layer 180, between the common electrode CE and the pixel electrode PE.

According to the first exemplary embodiment, an angular filter 210 is disposed between the backlight unit 140 and the color conversion layer 170. Referring to FIG. 3, the angular filter 210 is disposed between the first polarizer 150 and the color conversion layer 170.

Although not illustrated, a passivation layer (not illustrated) may be disposed between the first polarizer 150 and the angular filter 210, or between the color conversion layer 170 and the angular filter 210. In addition, an adhesive layer (not illustrated) may be disposed between respective layers for adhesion.

The angular filter 210 may block a light incident at a predetermined incident angle or reduce a transmittance of a light incident at a predetermined incident angle. In the case where a light incident at a predetermined incident angle is blocked or reduced by the angular filter 210, a light passing through the angular filter 210 may have directivity. Accordingly, the angular filter 210 may be referred to as a light directivity inducing filter.

Figure 4:
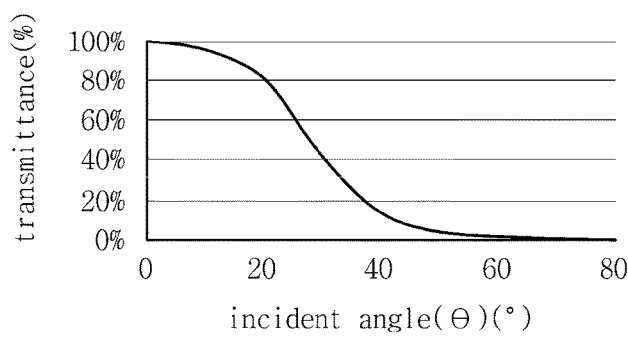
FIG. 4 is a graph illustrating transmittance of an angular filter according to an exemplary embodiment.

FIG. 4 is a graph illustrating transmittance of the angular filter 210 according to an exemplary embodiment.

According to the first exemplary embodiment, a transmittance of a light passing through the angular filter 210 varies depending on an incident angle θ. As used herein, the incident angle θ may be defined as an angle of an incident light L with respect to a normal direction N of a surface of the angular filter 210 (refer to FIG. 5).

According to the first exemplary embodiment, the angular filter 210 may block about 50% or more of a light incident to the angular filter 210 at an incident angle θ of about 30 degrees or more. For example, the angular filter 210 may block about 50% to about 80% of a light incident to the angular filter 210 at an incident angle θ of about 30 degrees or more. In another example, the angular filter 210 may block about 50% to about 100% of a light incident to the angular filter 210 at an incident angle θ of about 30 degrees or more.

In an exemplary embodiment, the angular filter 210 may have a transmittance of about 50% or less with respect to a light incident to the angular filter 210 at an incident angle θ of about 30 degrees or more. For example, the angular filter 210 may have a transmittance ranging from about 20% to about 50% with respect to a light incident to the angular filter 210 at an incident angle θ of about 30 degrees or more. In another example, the angular filter 210 may have a transmittance ranging from about 0% to about 50% with respect to a light incident to the angular filter 210 at an incident angle θ of about 30 degrees or more.

According to the first exemplary embodiment, a ratio of a transmittance of a light incident to the angular filter 210 at an incident angle of about 30 degrees or more with respect to a transmittance of a light incident to a front surface of the angular filter 210, i.e., an incident light having an incident angle of about 0 degree, may be adjusted to about 0.5 or less.

For example, the angular filter 210 may block about 50% or more of a blue light incident to the angular filter 210 at an incident angle of about 30 degrees or more.

In addition, the angular filter 210 may block about 70% or more of a light incident to the angular filter 210 at an incident angle θ of about 40 degrees or more. The angular filter 210 may block about 85% or more of a light incident to the angular filter 210 at an incident angle θ of about 45 degrees or more.

In addition, the angular filter 210 may have a transmittance of about 75% or more with respect to a light incident to the angular filter 210 at an incident angle θ of about 20 degrees or less. For example, the angular filter 210 may have a transmittance ranging from about 75% to about 100% with respect to a light incident to the angular filter 210 at an incident angle θ of about 20 degrees or less.

According to the first exemplary embodiment, a great portion of a light incident to the angular filter 210 at an incident angle θ ranging from about 0 degree (i.e., a light incident to the front surface of the angular filter 210) to about 30 degrees passes through the angular filter 210, but a great portion of a light incident to the angular filter 210 at an incident angle of about 30 degrees or more is blocked by the angular filter 210.

As such, when a light, i.e., a side light, incident to the angular filters 210 at an oblique angle is blocked, unnecessary light emission of the pixels PX1, PX2, and PX3 by the side light may be substantially prevented. In particular, when one pixel is in a black state, the pixel is prevented from emitting light by the side light. Accordingly, a contrast ratio of the display device 101 increases, and the display characteristics of the display device 101 may be improved.

The following Table 1 shows contrast ratios of a display device including the angular filter 210 according to the first exemplary embodiment (Test Example 1) and a display device not including the angular filter 210 (Comparative Example 1). Herein, when a white illuminance and a black illuminance of the display device not including the angular filter 210 (Comparative Example 1) are each assumed to be 100, a relative white illuminance and a relative black illuminance of the display device including the angular filter 210 (Test Example 1) are shown In Table 1. Further, the contrast ratio CR is represented as a percentage ratio (% ratio) of the white illuminance to the black illuminance.

TABLE 1

|  | Comparative Example 1 | Test Example 1 |
|---|---|---|
| White illuminance (W) | 100 | 109 |
| Black illuminance (B) | 100 | 21 |
| Contrast ratio CR (%) | 100 | 519 |

Referring to Table 1, when the black illuminance of the display device not including the angular filter 210 (Comparative Example 1) is assumed to be 100, the relative black illuminance of the display device including the angular filter 210 (Test Example 1) is 21. Further, when the contrast ratio of the display device not including the angular filter 210 (Comparative Example 1) is assumed to be 100%, the relative contrast ratio of the display device including the angular filter 210 (Test Example 1) is 519%. As such, the display device including the angular filter 210 (Test Example 1) has a contrast ratio of about 5.19 times the contrast ratio of the display device not including the angular filter 210 (Comparative Example 1).

Figure 5:
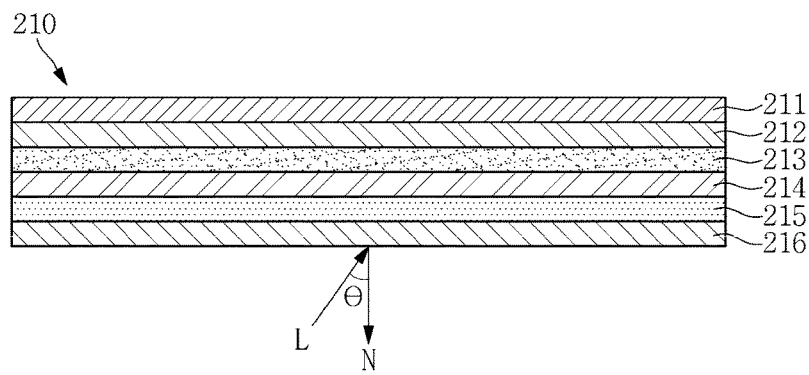
FIG. 5 is a cross-sectional view illustrating an angular filter according to an exemplary embodiment.

FIG. 5 is a cross-sectional view illustrating the angular filter 210 according to an exemplary embodiment.

According to the first exemplary embodiment, the angular filter 210 is an interference filter and includes a plurality of thin films (layers) having different refractive indices.

Referring to FIG. 5, the angular filter 210 may include a first layer 211 having light transmittance and having a first refractive index, and a second layer 212 having light transmittance and having a second refractive index different from the first refractive index. The angular filter 210 may further include a third layer 213, a fourth layer 214, a fifth layer 215, and a sixth layer 216. Respective refractive indices of the third layer 213, the fourth layer 214, the fifth layer 215 and the sixth layer 216 may be the same as or different from the refractive index of either the first layer 211 or the second layer 212. The refractive indices of neighboring layers are different from one another.

However, the structure of the angular filter 210 according to exemplary embodiments is not limited to FIG. 5. The angular filter 210 may have various stacked structures.

For example, the angular filter 210 may be formed by laminating a thin film (layer) including a high refractive index material and a thin film (layer) including a low refractive index material a plurality of times. A selective light transmitting function of the angular filter 210 may be achieved by multilayer interference phenomenon and reflection characteristic. Materials having a low refractive index may include, for example, MgF2 and SiO2. Materials having a high refractive index may include, for example, Ag, TiO2, Ti2O3, and Ta2O3. However, the materials forming the angular filter 210 are not limited thereto. The thickness of each thin film may be determined in a range of about ⅛ to about ½ of the wavelength of a transmitted light based on the design.

The angular filter 210 may have a structure in which a plurality of dielectric thin films having different refractive indices are stacked. In such an exemplary embodiment, multilayer interference phenomenon occurs due to reflection at interlayer interfaces.

Based on a thin film constituting the angular filter 210, light incident at an arbitrary angle may be selectively transmitted or reflected, and thus a light utilization rate may be improved. For example, when a light L incident to the color conversion layer 170 is a blue light, the angular filter 210 may be designed to block a blue light incident at a predetermined angle. In such a manner, the angular filter 210 may block the side light incident to the color conversion layer 170.

The angular filter 210 may have a film shape. The angular filter 210 in the form of a film may be attached to be used, where necessary.

Further, the angular filter 210 may be formed directly on a substrate. For example, the angular filter 210 may be formed by repeatedly laminating a high refractive index material and a low refractive index material in an alternate manner on a substrate.

Figure 6:
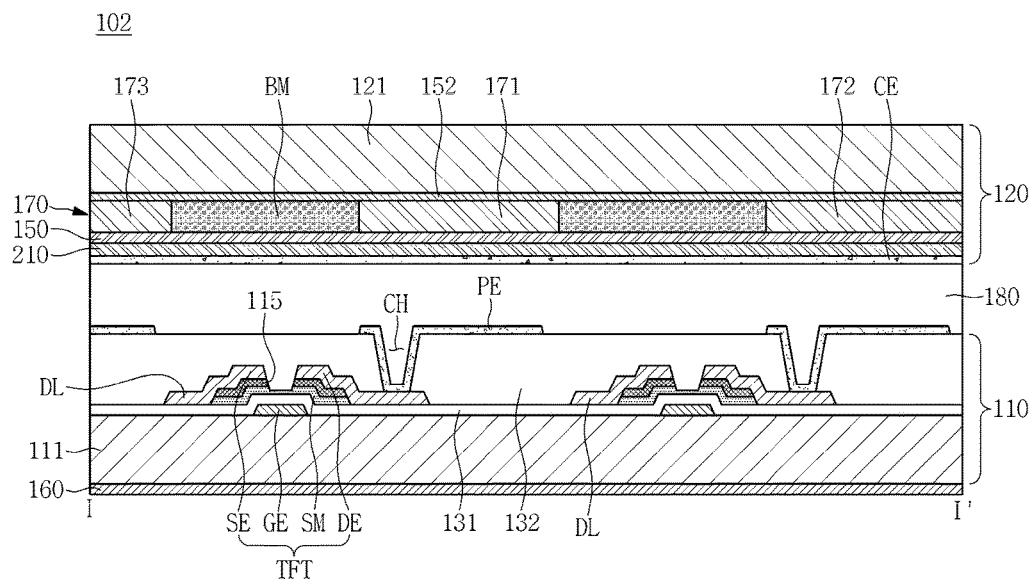
FIG. 6 is a cross-sectional view illustrating a display device according to a second exemplary embodiment.

FIG. 6 is a cross-sectional view illustrating a display device 102 according to a second exemplary embodiment. Hereinafter, in order to avoid repetition, descriptions of the above-described components will be omitted.

An angular filter 210 according to the second exemplary embodiment is disposed between a light amount control layer 180 and a first polarizer 150. Referring to FIG. 6, the angular filter 210 is disposed between a common electrode CE and the first polarizer 150. In such an exemplary embodiment, the angular filter 210 in the form of a film may be used.

Although not illustrated, a passivation layer may be disposed between the first polarizer 150 and the angular filter 210, or between the common electrode CE and the angular filter 210, and an adhesive layer may be disposed.

Figure 7:
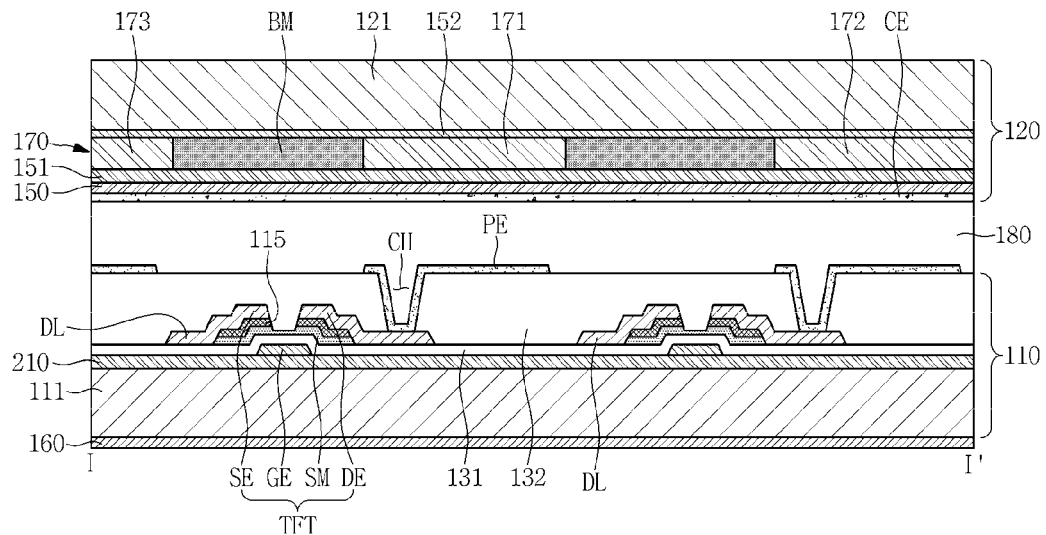
FIG. 7 is a cross-sectional view illustrating a display device according to a third exemplary embodiment.

FIG. 7 is a cross-sectional view illustrating a display device 103 according to a third exemplary embodiment.

According to the third exemplary embodiment, an angular filter 210 is disposed on a first substrate 111. Referring to FIG. 7, the angular filter 210 is disposed between the first substrate 111 and a pixel electrode PE.

According to the third exemplary embodiment, the angular filter 210 may be formed directly on one surface of the first substrate 111. For example, the angular filter 210 may be formed by repeatedly laminating a high refractive index material and a low refractive index material on one surface of the first substrate 111.

In addition, referring to FIG. 7, the display device 103 according to the third exemplary embodiment includes a passivation layer 151 between a first polarizer 150 and a color conversion layer 170. The passivation layer 151 protects the first polarizer 150 and the color conversion layer 170.

Figure 8:
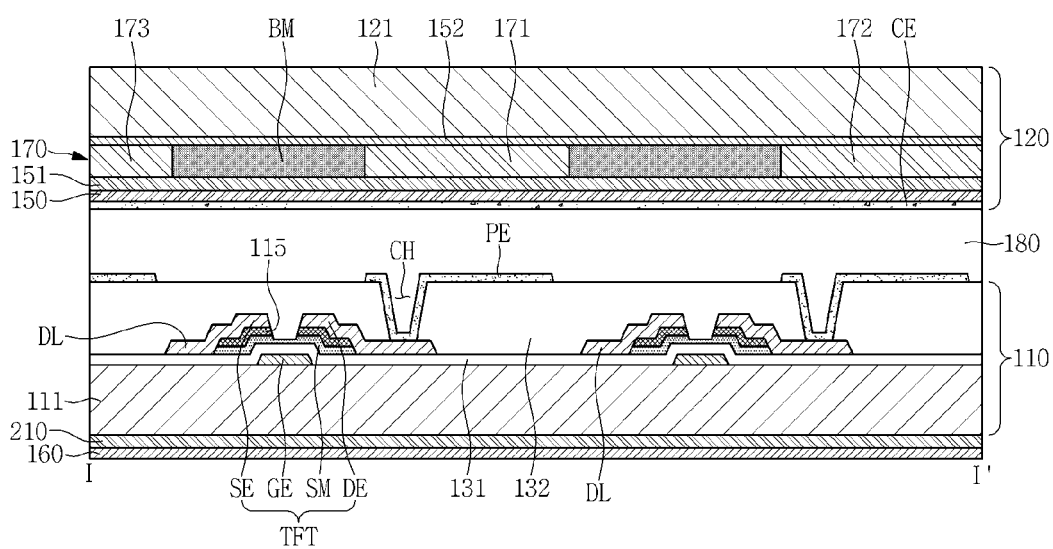
FIG. 8 is a cross-sectional view illustrating a display device according to a fourth exemplary embodiment.

FIG. 8 is a cross-sectional view illustrating a display device 104 according to a fourth exemplary embodiment.

According to the fourth exemplary embodiment, an angular filter 210 is disposed between a backlight unit 140 and a first substrate 111. Referring to FIG. 8, the angular filter 210 is disposed between the first substrate 111 and a second polarizer 160. In addition, the display device 104 according to the fourth exemplary embodiment includes a passivation layer 151 between a first polarizer 150 and a color conversion layer 170.

According to the fourth exemplary embodiment, the angular filter 210 may be formed directly on another surface of the first substrate 111. For example, the angular filter 210 may be formed by repeatedly laminating a high refractive index material and a low refractive index material on a rear surface of the first substrate 111.

Figure 9:
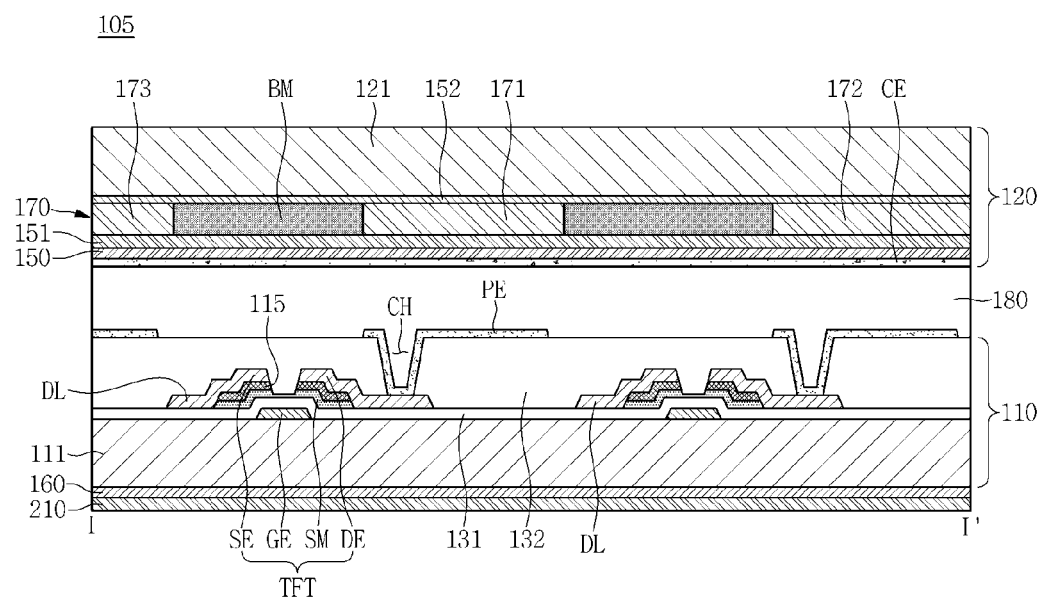
FIG. 9 is a cross-sectional view illustrating a display device according to a fifth exemplary embodiment.

FIG. 9 is a cross-sectional view illustrating a display device 105 according to a fifth exemplary embodiment. Referring to FIG. 9, an angular filter 210 is disposed on a second polarizer 160. In such an exemplary embodiment, the angular filter 210 in the form of a film may be used. In addition, referring to FIG. 9, the display device 105 according to the fifth exemplary embodiment may include a passivation layer 151 between a first polarizer 150 and a color conversion layer 170.

As set forth above, according to one or more exemplary embodiments, the display device includes an angular filter, thus having an excellent contrast ratio and excellent color rendering capability.

While the present inventive concept has been illustrated and described with reference to the exemplary embodiments thereof, it will be apparent to those of ordinary skill in the art that various changes in form and detail may be made thereto without departing from the spirit and scope of the present inventive concept.

What is claimed is:

1. A display device comprising:
   a backlight unit configured to emit a light;
   a first substrate on a path of a light emitted from the backlight unit;
   a pixel electrode on the first substrate;
   a light amount control layer on the pixel electrode;
   a first polarizer on the light amount control layer;
   a color conversion layer on the first polarizer; and
   an angular filter between the backlight unit and the color conversion layer,
   wherein the color conversion layer comprises a phosphor, and
   the angular filter is configured to block 50% or more of a light incident to the angular filter at an incident angle of 30 degrees or more, a percentage of the light blocked dependent upon the incident angle.

2. The display device as claimed in claim 1, wherein the angular filter blocks 50% or more of a blue light incident to the angular filter at an incident angle of 30 degrees or more.

3. The display device as claimed in claim 1, wherein the angular filter is between the first polarizer and the color conversion layer.

4. The display device as claimed in claim 1, wherein the angular filter is between the light amount control layer and the first polarizer.

5. The display device as claimed in claim 1, wherein the angular filter is between the first polarizer and the pixel electrode.

6. The display device as claimed in claim 1, wherein the angular filter is between the backlight unit and the first substrate.

7. The display device as claimed in claim 1, further comprising a second polarizer between the backlight unit and the light amount control layer.

8. The display device as claimed in claim 7, wherein the angular filter is on the second polarizer.

9. The display device as claimed in claim 1, wherein the angular filter comprises:
   a first layer having light transmittance and having a first refractive index; and
   a second layer having light transmittance and having a second refractive index different from the first refractive index.

10. The display device as claimed in claim 1, wherein the color conversion layer comprises:
    a red color conversion portion absorbing a blue light and emitting a red light; and
    a green color conversion portion absorbing a blue light and emitting a green light.

11. The display device as claimed in claim 10, wherein the color conversion layer further comprises a transmissive portion transmitting a blue light.

12. The display device as claimed in claim 1, wherein the light amount control layer is a liquid crystal layer.

13. The display device as claimed in claim 1, wherein the phosphor comprises:
    a core; and
    a shell surrounding the core.

14. The display device as claimed in claim 13, wherein the core comprises at least one selected from the group consisting of: PbSe, InAs, PbS, CdSe, InGaP, CdTe, CdS, ZnSe, ZnTe, ZnS, HgTe and HgS.

15. The display device as claimed in claim 13, wherein the shell comprises at least one selected from the group consisting of: CuZnS, CdSe, CdTe, CdS, ZnSe, ZnTe, ZnS, GaP, HgTe, and HgS.

16. The display device as claimed in claim 1, wherein the percentage of the light blocked increases as the incident angle increases.

17. The display device as claimed in claim 16, wherein the angular filter is configured to block 70% or more of a light incident to the angular filter at an incident angle of 40 degrees or more, and to block 85% or more of a light incident to the angular filter at an incident angle of 45 degrees or more,
the angular filter further configured to have a transmittance of 75% or more of a light incident to the angular filter at an incident angle of 20 degrees or less.

18. The display device as claimed in claim 1, wherein the angular filter is configured to block 50% or more of all red, green, and blue light incident to the angular filter at an incident angle of 30 degrees or more.

19. The display device as claimed in claim 1, wherein the angular filter is configured to have a ratio of a transmittance of the light incident to the angular filter at an incident angle of 30 degrees or more with respect to a transmittance of a light incident to the angular filter at an incident angle of 0 degrees to be 0.5 or less.

20. The display device as claimed in claim 1, wherein the angular filter overlaps the color conversion layer in a plan view.

* * * * *